Figure 1:
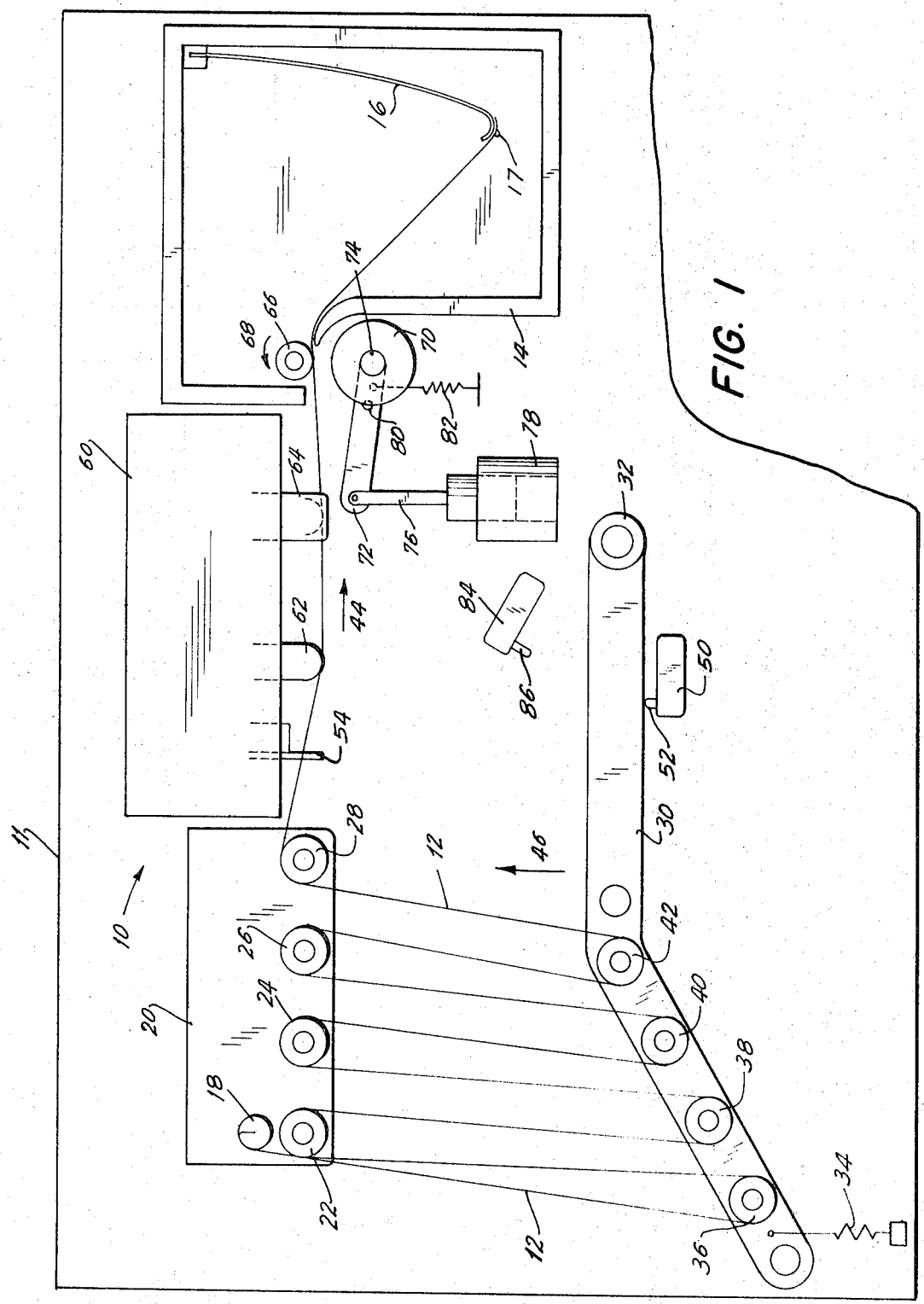

United States Patent

[11] 3,568,905

[72] Inventors Hans F. Napfel
　　　　　　　Huntington;
　　　　　　　Lee H. Schank, Melville; Norman Buten,
　　　　　　　Douglaston, N.Y.
[21] Appl. No. 823,266
[22] Filed May 9, 1969
[45] Patented Mar. 9, 1971
[73] Assignee Fairchild Camera and Instrument
　　　　　　　Corporation
　　　　　　　Syosset, L.I., N.Y.

[54] TAPE FEEDING RETRACE MECHANISM
　　　6 Claims, 2 Drawing Figs.
[52] U.S. Cl.................................................... 226/50,
　　　　　　　　　　　　　　　　　　　　　　　　　　　226/121
[51] Int. Cl...................................................... G11b 15/29

[50] Field of Search........................................... 226/50,
　　　　　　　　　　　　　　　　　　　　　121, 143; 274/4D, 110

[56] References Cited
UNITED STATES PATENTS
3,289,189　11/1966　Clark et al................... 226/121X Primary Examiner—Allen N. Knowles
Attorneys—James J. Trainor, Roger Borovoy and Kane,
　Dalsimer, Kane, Sullivan and Smith ABSTRACT: A mechanism for drive and rapid retrace of a length of recording tape to be used in a linear manner in a teaching apparatus or the like. The tape is carried by a retrace arm and driven in one direction in opposition to a spring force by a driven capstan into a storage compartment thereafter to be rapidly withdrawn from the compartment when not subjected to driving forces by the spring force.

INVENTOR
HANS F. NAPFEL
LEE H. SCHANK
NORMAN BUTEN
BY
ATTORNEYS

TAPE FEEDING RETRACE MECHANISM

The present invention relates to a mechanism for driving a length of recording tape from and returning the same to an initial time zero location. Particularly the mechanism is adapted for use with a teaching apparatus thereby to drive, in one direction, a length of tape in a linear timed fashion from a limit position to allow receipt of transcription of a prerecorded master or mimicked phrase sequence and, thereafter, to rapidly drive the tape in the other direction to the limit position for replay, rerecording and comparison of the recorded information.

The prior art is replete with systems employing a recording tape for use in a teaching application. Thus, there are many prior systems in which prerecorded phrase sequences or otherwise, containing, in addition, a motivation lead-in stimulus, are used for teaching since it has been recognized that actual repetition by a student and comparison of the same with the prerecorded master phrase greatly speeds the learning process by the synergistic effect attained. The ramifications of this type of a teaching process are many and well recognized by those knowledgeable in the particular art.

Most, if not all, of the prior art devices of this type employ a tape of an endless loop variety. In this connection, the tape is generally caused continuously to be fed past each of an erase and record-reproduce head or combination in carrying out a teaching operation. As may be apparent, use of an endless tape necessitates either locating, within the confines of the tape, the inception of the transcription of the master version after transcribing the student version each time a comparison is desired or allowing the tape to pass full cycle past the heads when comparison is desired. In the first instance, there is unquestionable difficulty involved and the necessity of manual involvement with regard to machine manipulations has a distracting effect which, psychologically, should be kept to an absolute minimum from a teaching standpoint. Distractions often result in loss of motivational impetus. In the second instance, there is unquestionable delay. Both situations are aggravated due to the need for provision of tapes of greater length than necessary thereby to accommodate the operation to the reception of a student version at a talking frequency slower than that of the master to provide leeway against recording overlap and erasure.

In accordance with the foregoing, it is a principal object of the invention to employ, in a teaching application, equipment adapted to play and simultaneously record a master lesson phrase, thereafter to provide a transcription of the master and receive a mimicked version thereof for comparison, all without any considerable conscious effort by the student and with a minimum of delay.

A further object is the provision of a retrace mechanism to accommodate drive in a linear manner, of a recording tape in one direction from a limit position and provide for rapid retrace of the tape upon return to the limit position.

Other objects and advantages of the present apparatus will be clearly evident as the remaining discussion to be read in conjunction with the accompanying drawings is developed. As will be apparent, this discussion pertains to what may be considered a preferred embodiment of the invention which is not intended to be limited thereto other than as so limited by the appended claims.

In carrying out the aforementioned objects the invention provides a retrace arm which is movable in two directions and biased in one of the same. A recording tape, fixedly mounted at its ends, is carried, in part, by the arm and adapted for movement past a record-reproduce head thereby both to receive and transmit audible information. Disengageable drive means are mounted in juxtaposition to the tape to drive the latter, upon engagement, in one direction in opposition to the bias force whereby, upon disengagement, the bias force rapidly drives the tape in the other direction.

Figure 2:
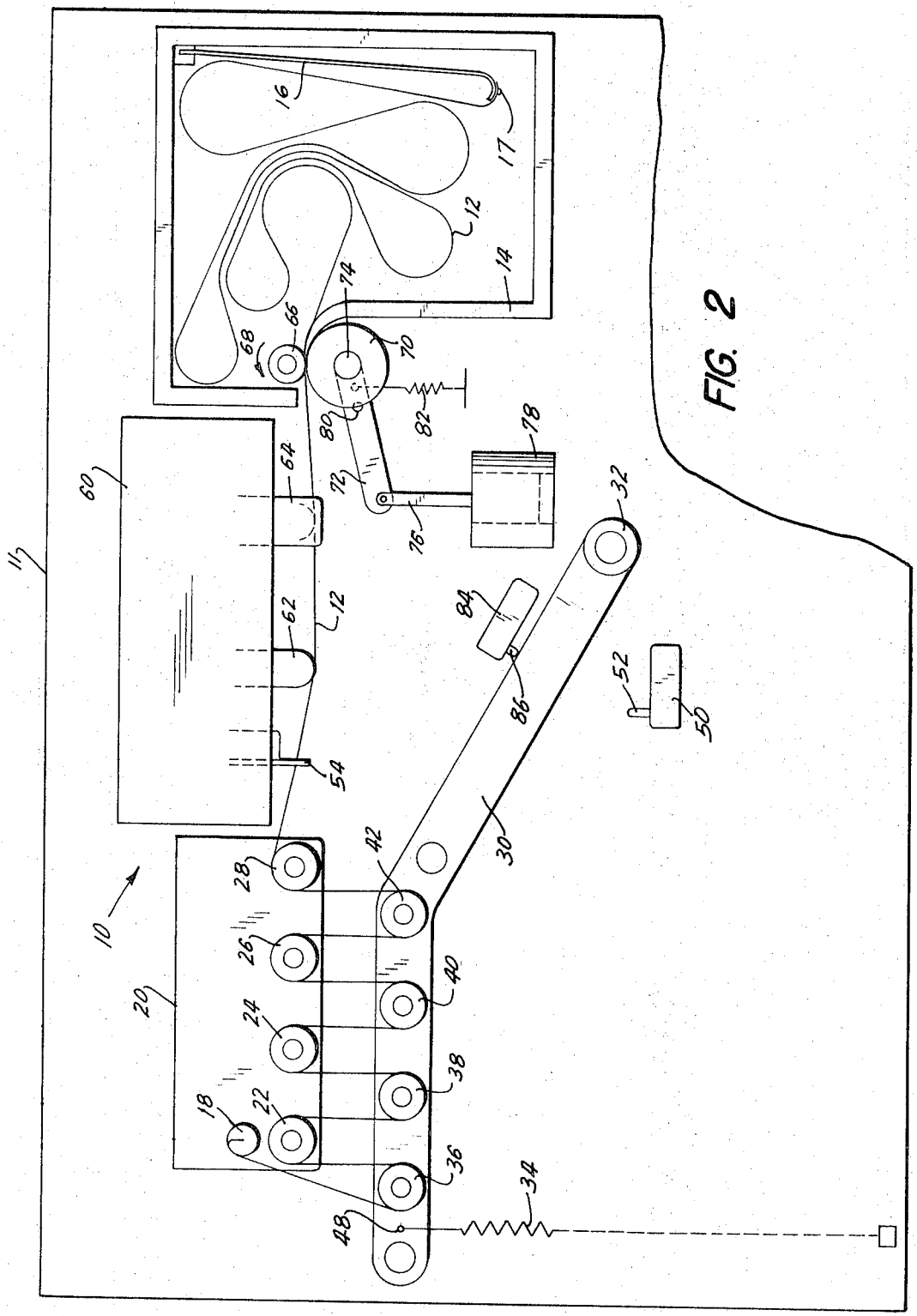

The accompanying drawings both illustrate and form a part of the present invention. By these drawings:

FIG. 1 is a schematic top plan view of the tape transport unit of the invention prior to the commencement of either a record or playing operation with the tape carriage at one limit position with the tape at time zero; and FIG. 2 is a view similar to FIG. 1 yet showing the tape carriage at a second limit position after completion of an operation and immediately prior to drive release for tape retrace.

The tape transport unit, now to be described with reference to the drawing FIGS., is denoted generally by the numeral 10. In the schematic presentation, the apparatus is mounted or otherwise supported in a convenient manner by a chassis 11, only the top surface of which is shown in the FIGS. The chassis may take any form, as desired.

The chassis may also conveniently serve as a housing for a replay unit capable of accepting a source of master lesson material carried by any one of, for example, a record, tape cassette, filmstrip, etc., (none of which are shown). The master lesson may be a group of prerecorded phrase sets. Also, and not specifically shown, yet similarly carried by the chassis is the audio pickup mechanism and the tape recorder reproducer which, together with accompanying electrical circuitry, may form a teaching apparatus of the type wherein the master auricular transcription is both listened to by the student and simultaneously recorded for retention. Thus, a later comparison between the recorded master lesson material and a recorded mimicked version of the master may be made. In this connection, the recording tape and particularly the transport unit that causes movement of the tape for recording and transcription purposes forms an integral part of the overall system and is of particular importance with regard to the present invention.

The audio pickup mechanism and tape recorder reproducer, as well as its circuitry, form only an incidental part of the present invention. Therefore, except as is necessary for a complete understanding of the invention, no specific discussion is hereinafter directed thereto.

Therefore, the following discussion is directed to both the manner and the operative mechanism which functions in a manner whereby a length of tape is fed past each of an erase and a record-reproduce head to receive or replay the model transcription, thereafter followed by an automatic or manual rapid retrace of the tape, and then, a second feeding of the tape to receive or replay a student duplication. Further feeding and retrace of the tape allow a comparison to be made before attempting a subsequent phrase set.

The recording tape 12 is mounted by the transport apparatus and is of a length which, as choice dictates, meets the necessities of the operation desired in a teaching application. In most instances, a tape of 10—15 second duration has been found to be adequate.

Before continuing, it is considered that a brief discussion of a typical operative sequence which is achieved by use of the predetermined length tape and the present transport apparatus will allow a closer identification with the invention. Thus, the tape 12 is of the type containing a plurality of recording levels. In the sequence to be described, two levels are adequate. Operation finds the tape always to be movable from a time zero seconds during either a record or transcription phase irrespective of the level upon which information is being either received or reproduced. During the first feeding sequence, the master lesson, plus an intermixed inaudible subcarrier carried by the master source, is recorded on the master track. At the end of this phase of the operation, the tape is rapidly recycled to time zero. The tape may, as choice dictates, be recycled on the master track for replay or recycled and transferred to the student track at which time the student version is transcribed. The particular circuitry provided thereby to cause both the recycling and track transfer is of no particular interest and many circuits, for example, control logic circuits can appropriately provide this function. However, recycling may be accomplished by directing the end of the subcarrier on the master source whereupon the control logic directs the stoppage of, for example, the turntable drive motor, if there is a record source, and causes disengagement of the tape drive for rapid retrace. The particular program may be set up for retrace and transfer at this point. Retrace may also be accomplished by pressing a student record switch which also functions to release the tape drive for rapid retrace to time zero seconds.

As was the case in transcribing the master lesson, the student transcription contains, intermixed therein, an inaudible subcarrier. This subcarrier may be internally generated and controlled, for example, by the student record switch. Operation again, is controlled by system control logic which detects the end of the subcarrier on the master source to stop source transcription and either of the tape levels to rapidly recycle the tape. The particular sequence of operation, i.e., whether there may be a master recording, replay of the master, student recording, student replay and then cyclical comparison until termination, is optional. The control logic may be programmed to provide any desired sequence.

The tape 12 has its extreme ends immovable yet releasably fixed against movement. In this connection, what may be considered a first end is secured at 17 to an elongated leaf spring 16 disposed within a tape compartment 14. As is apparent from the FIGS., the leaf spring is yieldable thereby to absorb the shock which would otherwise be imparted to the tape at the abrupt termination of retrace. The second end is similarly secured to a stud or post 18 supported by a bracket 20. In this manner the tape is supported for linear motion and during each feeding operation, as to be described in detail, moves toward the compartment to be stored in random loop fashion (see FIG. 2).

A first series of pulley wheels 22—28 and their supporting shafts are carried by the bracket. The bracket may be in the form of a pair of spaced apart plates, only one of which is shown for clarity, which support the pulley shafts therebetween. Alternatively, the wheels may freely turn on the shafts or the shafts may be keyed to the pulley wheels and, in turn, journaled for rotation in the spaced plates forming bracket 20. The wheels have substantially smooth nongripping peripheries.

A retrace arm 30 is pivotally mounted as at 32 on the chassis 11. The retrace arm may be formed in a manner similar to the bracket 20. In this connection, the arm contains a pair of spaced elongated members. Again, for clarity, only a single member is shown in the FIGS.

A second series of pulley wheels 36—42 and their shafts are carried by the arm and disposed on the end opposite the pivot 32. The second series of wheels and shafts are similarly journaled for free rotation and similarly are provided with substantially smooth nongripping surfaces. The tape, from the second fixed end, is passed about and around the pulley wheels in both the first and second series and maintained under slight tension by means of biasing spring 34.

Upon driving impetus and drawing movement of the tape 12 in the direction of arrow 44 (FIG. 1), the pulley wheels, journaled for rotation as discussed, freely rotate at a speed substantially equal to the rate of tape drive. This has the advantage of reducing sliding friction to keep tape damage, which might otherwise be the result of sliding friction, to a minimum. Yet, during movement, the tape is physically supported.

The retrace arm 30 is normally biased in the counterclockwise direction and toward one limit control switch 50. All motion imparted to the tape by the tape drive is in opposition to the spring force developed. The spring force is easily overcome by the tape drive thereby to cause the retrace arm 30 to pivot about the fixed point 32 in the clockwise direction as the tape length shortens. Arm movement, indicated by the arrow 46, causes switch 50, heretofore in the open condition, to close upon release of actuator 52 for the interim up to and including tape retrace to the FIG. 1 position.

A guide 54 is located and immovably supported by a chassis between the pulley wheels and the tape compartment 14. The guide has a slot opening through which the tape is received to provide additional support for the tape during its travel and to aid in its positioning for passage past the recording head.

The erase head 62 and the record head 64 are also carried by the chassis mount 60. Both heads are situated adjacent the guide 54 to assure proper positioning of the tape during travel both toward the tape compartment and past the heads. In this manner and as conventional, during movement of the tape in the direction of arrow 44 while recording, the tape is constantly being erased of all voice and inaudible information thereby to present a cleared length of tape for recording. This, likewise, may be accomplished by a single head adapted for a dual purpose. Irrespective of the structure, the erase head normally is inoperative when the information stored on the tape is being reproduced as an audio signal by the electrical circuitry of the system.

A capstan 66 is positioned at the entrance to tape compartment 14. The capstan includes a roller keyed for rotation to a rotatable shaft that is constantly driven at a timed pace in the direction of arrow 68 by a drive motor (not shown) or other suitable prime mover. The roller surface is such that a gripping interaction may be maintained between it and the tape 12 thereby to drive the tape in the direction of arrow 44 during a record or sound reproduction operation.

A pinch roller 70 is also mounted adjacent the compartment entrance. The roller is supported at one end of an arm or link 72 pivoted between its ends at 80. The roller, mounted for free rotation by a shaft 74, is adapted to be pivotally movable into and out of engagement with the capstan to "pinch" the tape therebetween. Thus, the capstan drives the tape, as discussed. Suitably, the pinch roller 70 has a smooth, nongripping surface.

A second arm or link 76 is pivotally connected at the other end of link 72. Link 76 may form a part of or be connected to the armature of solenoid 78 which, upon being energized, draws the armature within its core. Generally, circuit sensing of the presence or absence of the inaudible subcarrier controls solenoid operation.

The pinch roller is normally biased by, for example, spring 82 to the FIG. 1 position and out of engagement with capstan 66. Energization, however, of solenoid 78 and consequent movement of the armature within the solenoid core overcomes this spring bias causing arm 72 to pivot counterclockwise about the fulcrum 80. This movement provides engagement of the pinch roller and capstan to drive the filmstrip passing therebetween into the tape compartment. Deenergization of the solenoid allows under spring action, the pinch roller to move out of engagement with the capstan. Rapid retrace of the tape to time zero under the action of biasing spring 34 is then possible.

Solenoid 78 is energized whenever the apparatus is in the record or audio reproduction mode. In this condition, the pinch roller is moved into engagement with the capstan so that the tape 12 is driven toward the tape compartment against the bias of spring 34. Tape drive continues until it is either manually recycled as by pressing a student record button prior to completion of a total operation or automatically recycled at the end of the audible transcription and upon system sensing the end of the inaudible subcarrier or recycled as a consequence of the retrace arm 30 moving to a second limit position as defined by switch 84. At this point, the normally closed switch 84, through actuator 86, opens thereby to open the solenoid circuit. As discussed, rapid retrace under the force of spring 34 then occurs.

From the foregoing detailed discussion it is apparent that the heretofore stated objects and advantages as well as other objects and advantages of the invention are uniquely carried out. It should also be apparent that various changes and modifications may be both made and incorporated in the discussed embodiment of the invention which is presented by way of explanation of the invention and that the invention is not to be limited thereto otherwise than as limited by the appended claims.

We claim:

1. A tape feeding and retrace mechanism in combination with a teaching apparatus of the type adapted both to record and play for comparison a master lesson transcription and a student mimicked version, said mechanism comprising a tape compartment, a support means, an extended length of recording tape having its opposite ends substantially immovably fixed to said support means, a leaf spring positioned within said compartment for releasably mounting one of said tape ends whereby upon bias drive of said tape said leaf spring compensates for shock imparted thereto following retrace to a limit position, means mounted by support means carrying said tape between its ends so that the tape, capable of movement in timed relation in one direction from a limit position is oriented thereby to pass a record head for recording and playing for comparison of said master and student transcription, is movable at a relatively faster speed in the opposite direction to said limit position, means mounted by said support and tape carrying means tending to bias the tape in said opposite direction toward said limit position, and drive means carried by said support and cooperably engageable with said tape thereby to overcome said bias and drive the tape in said one direction and disengageable from said tape whereby said biasing means rapidly drives the same in said opposite direction to said limit position.

2. A tape feeding and retrace mechanism in combination with a teaching apparatus of the type adapted both to record and play for comparison a master lesson transcription and a student mimicked version, said mechanism comprising a tape compartment, a support means, an extended length of recording tape having its opposite ends substantially immovably fixed to said support means, means mounted by said support means carrying said tape between its ends so that the tape, capable of movement in timed relation in one direction from a limit position is oriented thereby to pass a record head for recording and playing for comparison of said master and student transcription, is movable at a relatively faster speed in the opposite direction to said limit position, means mounted by the said support and tape carrying means tending to bias the tape in said opposite direction toward said limit position, and drive means carried by said support and cooperably engageable with said tape thereby to overcome said bias and drive the tape in said one direction and disengageable from said tape, said drive means including a driven capstan and a pinch roller, said capstan and roller being mounted by the support substantially adjacent a tape entrance to said compartment and relatively moved into engagement thereby to drive the tape in said one direction and into said tape compartment whereby said biasing means rapidly drives the same in said opposite direction to said limit position.

3. The combination of claim 2 wherein said tape carrying means includes a first and second plurality of rotatable wheels, a retrace arm, said arm being of elongated length and mounted upon the support at one end for pivotal movement in one direction as said tape is driven in timed relation and in the other direction due to said bias means carried by the other end, said plurality of rotatable wheels being carried by said retrace arm and said support so that said tape may be threaded therearound.

4. The combination of claim 2 wherein said limit position is defined by a first switch, and said tape carrying means including a retrace arm, a plurality of rotatable elements carried by said arm between its ends about which the tape is threadedly engaged, said arm mounted at one end by said support for pivotal movement away from said limit position upon timed drive of said tape, a second switch being angularly located with respect to said first switch thereby to define a second limit position between which said arm pivots during timed tape drive and retrace.

5. A tape feeding and retrace mechanism in combination with a teaching apparatus of the type adapted both to record and play for comparison a master lesson transcription and a student mimicked version, said mechanism comprising a tape compartment, a support means, an extended length of recording tape having its opposite ends substantially immovably fixed to said support means, means mounted by said support means carrying said tape between its ends so that the tape, capable of movement in timed relation in one direction from a limit position is oriented thereby to pass a record head for recording and playing for comparison of said master and student transcription, is moveable at a relatively faster speed in the opposite direction to said limit position, means mounted by said support and tape carrying means tending to bias the tape in said opposite direction toward said limit position, and drive means carried by said support and cooperably engageable with said tape thereby to overcome said bias and drive the tape in said one direction and disengageable from said tape, said drive means including a driven capstan and a pinch roller, and means for causing relative movement of the capstan and pinch roller into said cooperable engagement with said tape, said means for causing relative movement including a link, said link supporting said pinch roller on one end and pivotable about a fixed fulcrum, resilient means for biasing said pinch roller out of engagement, and means at said link second end for pivoting the link and moving said pinch roller into said cooperable engagement, whereby said biasing means rapidly drives the same in said opposite direction to said limit position.

6. The combination of claim 5 wherein said means at said link second end includes an armature adapted for reciprocable movement within a core of a solenoid whereby energization of said solenoid causes said tape to be driven in said one direction.